United States Patent
LaRocca et al.

(10) Patent No.: US 6,578,201 B1
(45) Date of Patent: Jun. 10, 2003

(54) MULTIMEDIA STREAM INCORPORATING INTERACTIVE SUPPORT FOR MULTIPLE TYPES OF SUBSCRIBER TERMINALS

(75) Inventors: Tobie J. LaRocca, San Jose, CA (US); Amy Yang, San Jose, CA (US); Gregory A. Erickson, San Francisco, CA (US)

(73) Assignee: Diva Systems Corporation, Redwood City, CA (US)

( * ) Notice: Subject to any disclaimer, the term of this patent is extended or adjusted under 35 U.S.C. 154(b) by 0 days.

(21) Appl. No.: 09/197,270

(22) Filed: Nov. 20, 1998

(51) Int. Cl.⁷ ............................................... H04N 7/173
(52) U.S. Cl. ......................... 725/86; 725/61; 725/135; 725/140; 709/201; 709/231
(58) Field of Search .................................. 725/109, 110, 725/111, 112, 113, 37, 135–6, 60–61, 91, 86; 348/6, 7, 10, 12, 508, 600; 345/25, 26, 113, 327, 342; 709/201–203, 217, 231, 140

(56) References Cited

U.S. PATENT DOCUMENTS

| | | | |
|---|---|---|---|
| 5,600,364 A | | 2/1997 | Hendricks et al. .............. 348/1 |
| 5,666,293 A | * | 9/1997 | Metz ......................... 395/200.5 |
| 5,734,822 A | | 3/1998 | Houha et al. ............. 395/200.6 |
| 5,886,732 A | * | 3/1999 | Humpleman .................. 348/10 |
| 5,978,855 A | * | 11/1999 | Metz ........................... 709/249 |
| 5,982,445 A | * | 11/1999 | Eyer et al. .................... 348/461 |
| 6,166,728 A | * | 12/2000 | Haman et al. ............... 345/327 |
| 6,201,538 B1 | * | 3/2001 | Wugofski .................... 345/327 |
| 6,208,335 B1 | * | 3/2001 | Gordon et al. .............. 345/327 |
| 6,253,375 B1 | * | 6/2001 | Gordon et al. ................ 725/88 |
| 6,305,019 B1 | * | 10/2001 | Dyer et al. .................... 725/91 |
| 6,314,573 B1 | * | 11/2001 | Gordon et al. ................ 725/61 |
| 6,317,885 B1 | * | 11/2001 | Fries .......................... 725/109 |
| 6,427,238 B1 | * | 7/2002 | Goodman et al. .......... 725/136 |

FOREIGN PATENT DOCUMENTS

WO    WO 98/41020    9/1998    ............ H04N/7/10

\* cited by examiner

Primary Examiner—Chris Grant
Assistant Examiner—Ngoc Vu
(74) Attorney, Agent, or Firm—Moser, Patterson & Sheridan, LLP

(57) ABSTRACT

A multimedia stream incorporating interactive support for multiple types of subscriber terminals. The multimedia stream is created by multiplexing several component streams. The component streams include a video stream, an audio stream, and an interactive data stream. The interactive data stream includes data specific to different types of subscriber terminals multiplexed together.

20 Claims, 12 Drawing Sheets

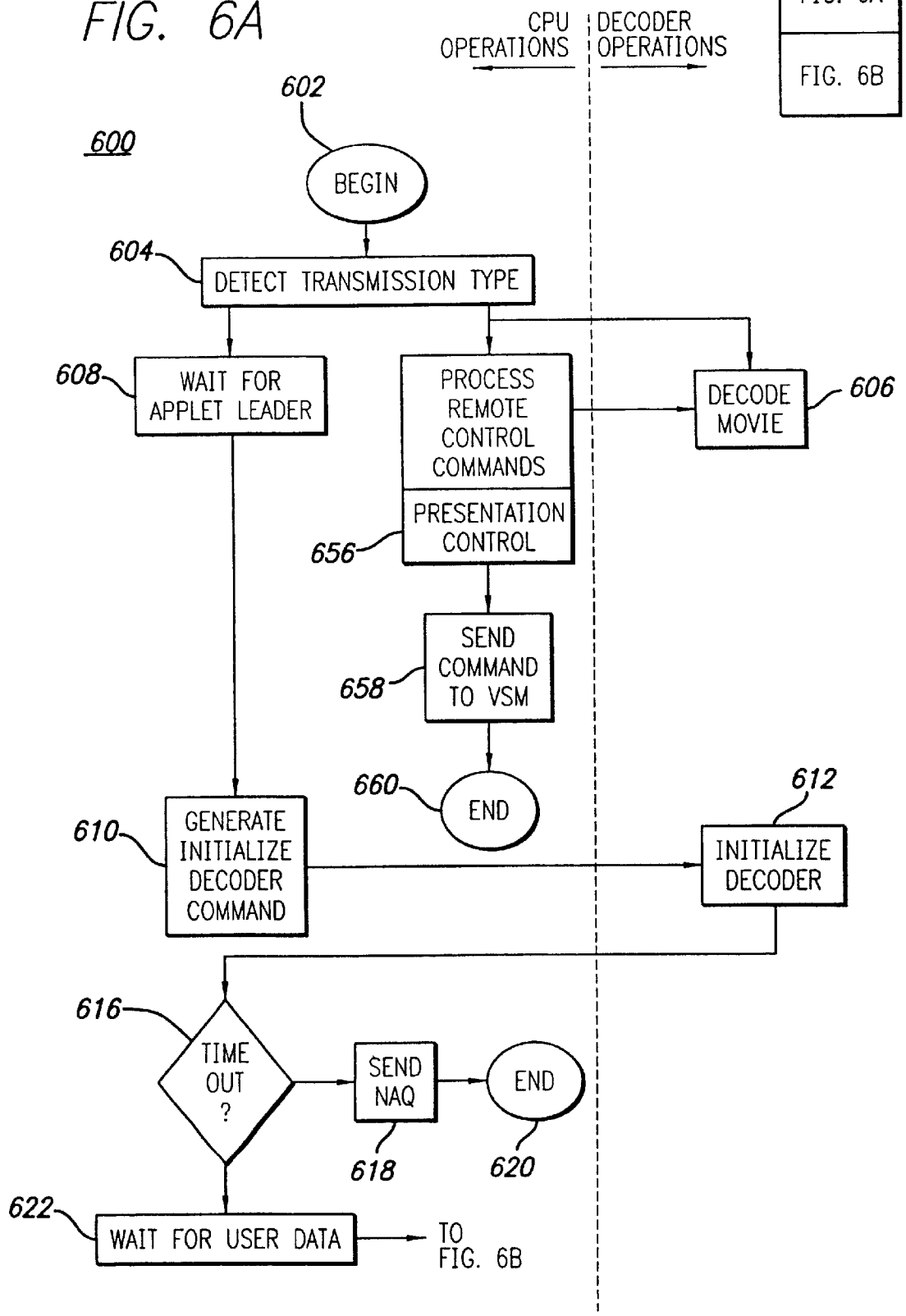

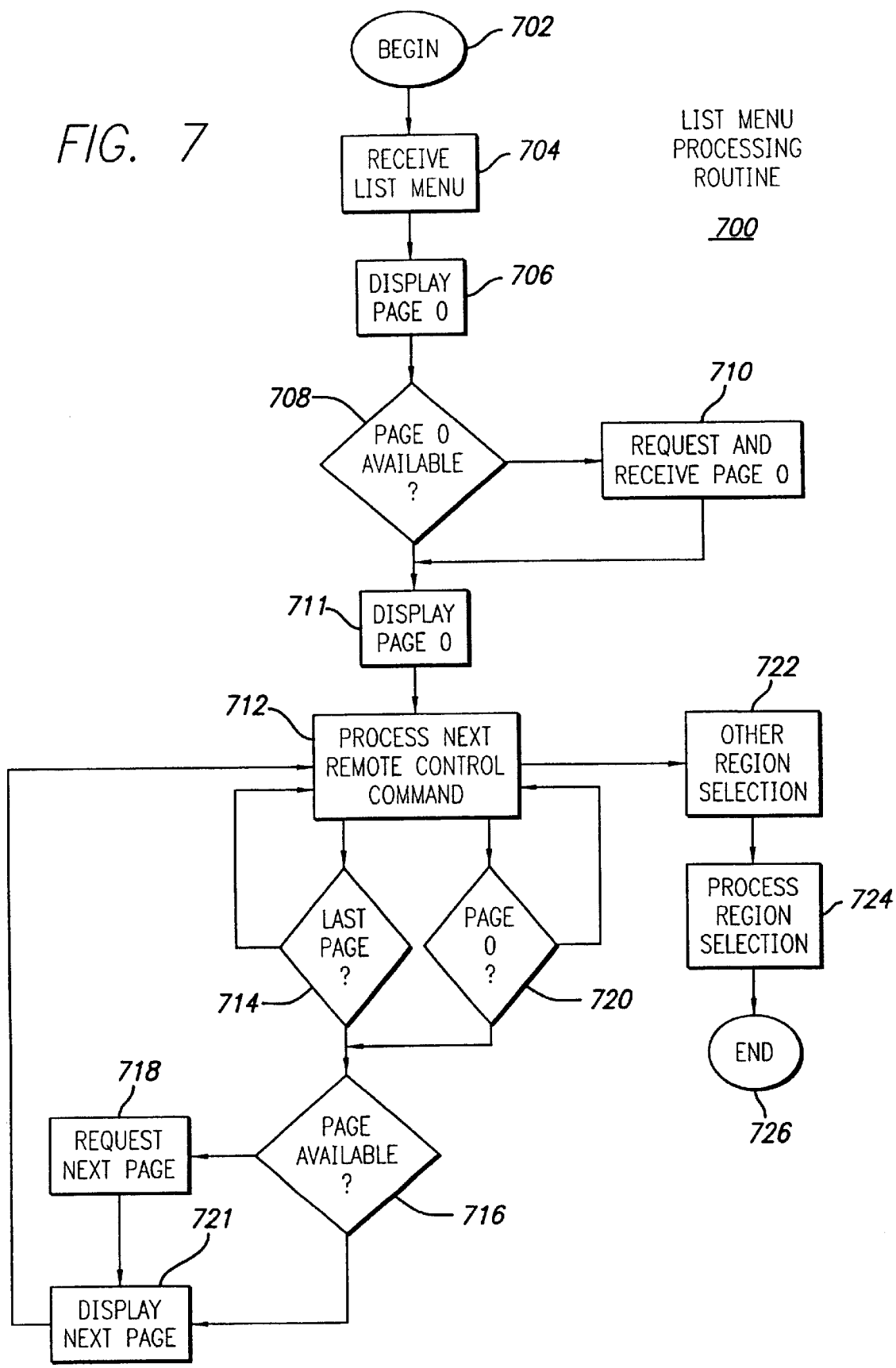

MULTIMEDIA STREAM INCORPORATING INTERACTIVE SUPPORT FOR MULTIPLE TYPES OF SUBSCRIBER TERMINALS

BACKGROUND OF THE INVENTION

1. Field of the Invention

The present invention relates to a system for delivering interactive information services, such as video, audio, library, interactive games, and the like to a plurality of subscribers. More particularly, the invention relates to a system for transmitting a multimedia signal and interactive data from a service provider to subscribers with different types of subscriber terminals.

2. Description of the Background Art

Recent advances in digital signal processing techniques and, in particular, advancements in digital compression techniques, have led to a plethora of proposals for providing new digital services to a subscriber's home via existing telephone and coaxial cable networks. For example, it has been proposed to provide hundreds of cable television channels to subscribers by compressing digital video, transmitting the compressed digital video over conventional coaxial cable television cables, and then decompressing the video at the subscriber's set top terminal. Another proposed application of this technology is a movie-on-demand video system in which a subscriber communicates directly with a video service provider via telephone lines to request a particular video program from: a video library and the requested video program is routed to the subscriber's home via telephone lines or via the coaxial television cables for immediate viewing. Other proposed video-on-demand systems use a frequency multiplexing technique to enable control information for a set top terminal to be transmitted through a cable network back to an information server. Such a system permits bi-directional communication over a single network.

In each of these information distribution systems, menus are displayed upon the subscriber's television and using a remote control device, a subscriber selects a desired program for viewing. A program code is then sent from the set top terminal through the communication system back to the service provider. The selected program is then recalled from memory by the service provider equipment and broadcast to the set top terminal that requested that information. Alternatively, the subscriber may telephone the service provider and request certain information that is displayed in a menu upon the subscriber's television or the subscriber's set top terminal or the television set may automatically tune, in response to the menu selection, to a broadcast channel to receive information transmitted on that channel.

An important problem in the currently available systems is that they generally provide interactive support for only one type of set top terminal. For example, a system may provide interactive support only for a type of terminal which is manufactured by General Instruments. Another system may provide interactive support only for another type of terminal which is manufactured by Scientific Atlanta, where the Scientific Atlanta terminal has various characteristics that make it incompatible with the General Instruments terminal. This problem of supporting only one type of terminal leads to various disadvantages. For example, to deploy the currently available systems, all set top terminals must be changed to that one type in order to be capable of receiving the interactive support. This is costly and also limits consumer choice of set top terminals. Alternatively, multiple information distribution systems may be developed and deployed, one for each type of set top terminal. This would also be costly. In addition, such multiple systems would not provide the same look and feel to users having different types of set top terminals.

SUMMARY OF THE INVENTION

The disadvantages heretofore associated with the prior art are overcome by the present invention. The present invention comprises a multimedia stream incorporating interactive support for multiple types of subscriber terminals. The multimedia stream is created by multiplexing several component streams. The component streams include a video stream, an audio stream, and an interactive data stream. The interactive data stream includes data specific to different types of subscriber terminals multiplexed together.

The present invention also comprises a method for providing interactive support to multiple types of subscriber terminals. The method includes the steps of: (a) providing an input generic definitions of screen objects and control data relating to the screen objects; (b) providing a first set of rules including modifications to the screen objects specific to a first type of subscriber terminal; (c) providing a second set of rules including modifications to the generic screen objects specific to a second type of subscriber terminal; (d) modifying the generic definitions by applying the first set of rules to generate a first output file specific to the first type of subscriber terminal; and (e) modifying the generic definitions by applying the second set of rules to generate a second output file specific to the second type of subscriber terminal.

The present invention further comprises a system for distributing video data while providing interactive support to multiple types of subscriber terminals. The system includes: (a) a source of video data to be distributed to a first subscriber with a first type of subscriber terminal and a second subscriber with a second type of subscriber terminal; (b) a source of interactive data to be distributed to the first and second subscribers; (c) a transport processing multiplexer for multiplexing the video data and the interactive data to generate a transport stream; and (d) where the interactive data comprises (i) a first interactive data specifically modified for use with the first type of subscriber terminal and (ii) a second interactive data specifically modified for use with the second type of subscriber terminal.

An advantage of the present invention is that only one multimedia stream is required to support multiple types of subscriber terminals on the same distribution network. Another advantage is that the support of multiple types of subscriber terminals is done in a way which facilitates giving users the same look and feel across the different types of subscriber terminals.

BRIEF DESCRIPTION OF THE DRAWINGS

The teachings of the present invention can be readily understood by considering the following detailed description in conjunction with the accompanying drawings.

FIG. 6 depicts the appropriate alignment of FIGS. 6A and 6B.

FIGS. 6A and 6B, taken together, depict a flow diagram of an applet transmission and execution routine.

FIG. 7 depicts a flow diagram of list information processing routine.

DETAILED DESCRIPTION

Figure 1:
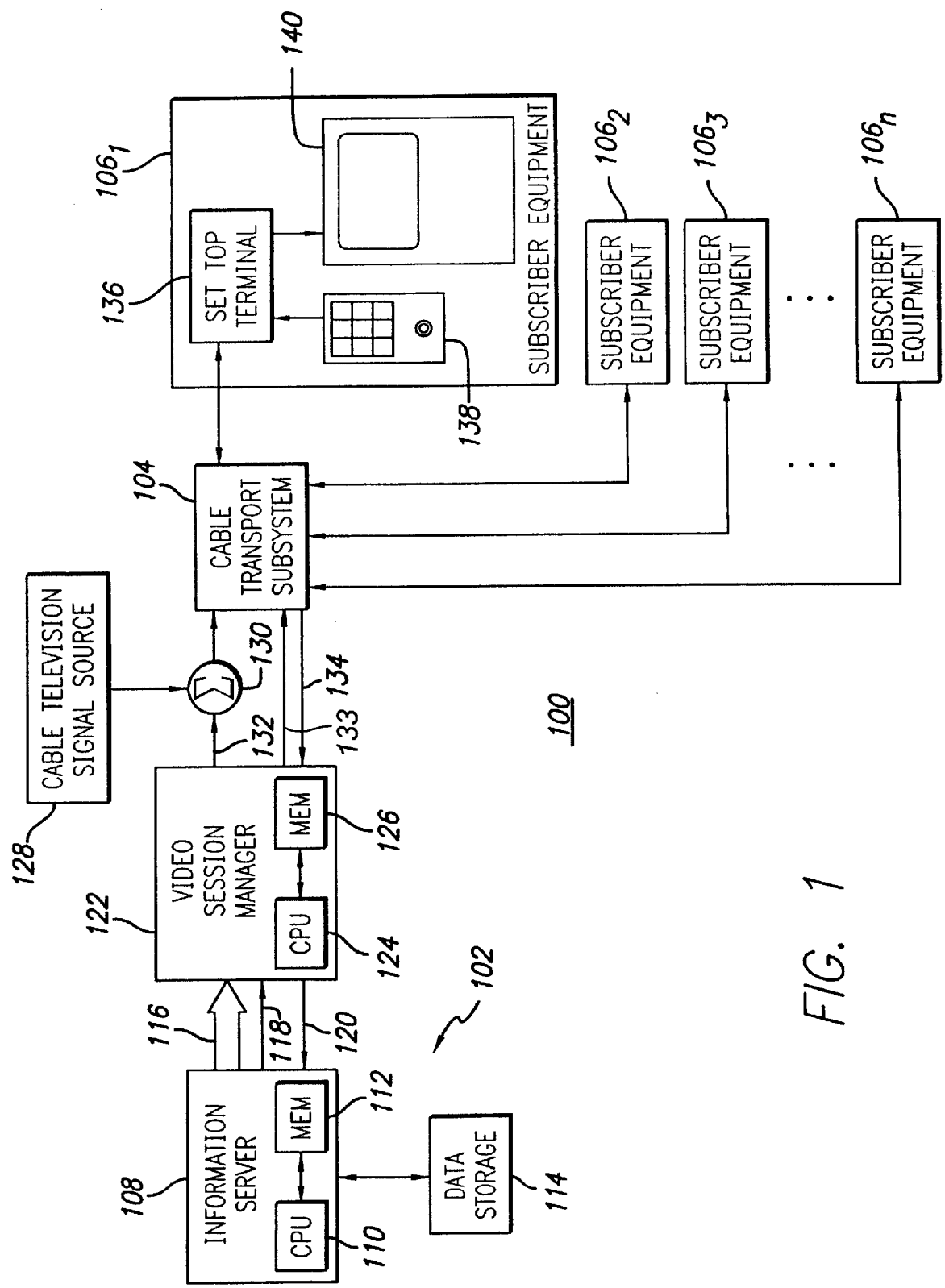
FIG. 1 depicts a high level block diagram of an interactive information distribution system containing the present invention.

FIG. 1 depicts a high level block diagram of the illustrative information distribution system 100 that incorporates the present invention. The system contains service provider equipment 102, a communications network 104 and subscriber equipment $106_n$, where n is an integer greater than zero. The service provider equipment 102 contains an information server 108 which is typically a parallel processing computer containing at least one central processing unit 110 and associated memory 112. The server interacts with a data storage device 114 (e.g., a disk drive array) that generally stores the subscriber information (e.g., video data) that will be recalled and downloaded to the subscriber. Additionally, within the service provider equipment is a video session manager 122 that provides session control of the information flowing to and from the server. Furthermore, the video session manager 122 contains its own central processing unit 124 and associated memory 126. The information server 108 is coupled to the video session manager via data path 1 16, synchronization clock path 118 and control path 120. The server 108 provides data streams on path 116 and a synchronization clock on path 118 in response to requests for information from the video session manager on path 120. These data streams are packetized and modulated onto a carrier that is compatible with the transmission requirements of the network 104.

The video session manager 122 accomplishes all of the transmission interface requirements of the system 100. Specifically, the video session manager 122 is coupled to subscriber equipment via a forward information channel 132, a forward command channel 133 and a back channel 134. All three of these channels are supported by the cable transport network. The video session manager contains a modulator for modulating the server data streams onto one or more carrier frequencies for transmission on the forward information channel. Additionally, the video session manager contains a modem for sending control information via the forward command channel and receiving control information via the back channel. Moreover, a conventional cable television signal source 128 is optionally coupled to the forward information channel via a signal coupler 130.

The network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

Each set top terminal 106 receives the data streams from the forward information channel, demodulates those streams and processes them for display on the display device 140 (e.g., a conventional television). In addition, the set top terminal 106 accepts commands from a remote control input device 138 or other input device. These commands are formatted, compressed, modulated, and transmitted through the network 104 to the video session manager 122. Typically, this transmission is accomplished through the back channel 134. These commands are preferably transmitted through the same network used to transmit information to the set top terminal. However, the back channel coupling the set top terminal to the server may be a separate network, e.g., a forward information channel through a television cable network and a back channel through a telephone network. The telephone network could also support the forward control channel. The video session manager 122 interprets each command sent from the set top terminal through the back channel and instructs the information server to perform certain functions to implement the subscriber request.

Figure 2:
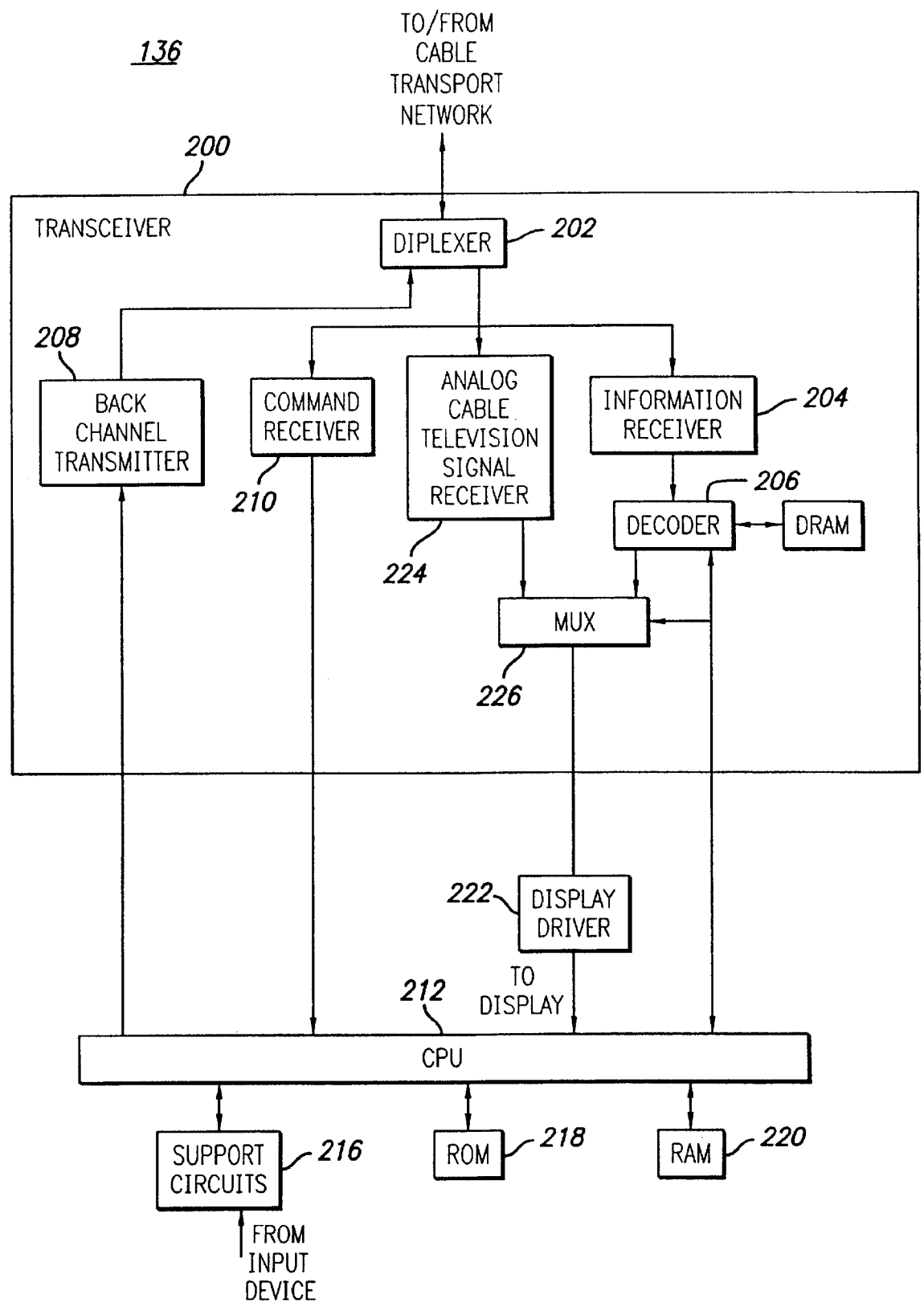
FIG. 2 depicts a block diagram of an illustrative set top terminal within the system of FIG. 1.

FIG. 2 depicts a block diagram of the set top terminal 136 which contains a transceiver 200, a central processing unit (CPU) 212 and a display driver 222. Of course, the functionality of the set top terminal 136 can be embedded within a single consumer electronics product such a television. As such, the description of a stand-alone set top terminal should be considered illustrative of the type of subscriber equipment that may be used to implement the present invention. Within the set top terminal 136, the CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers.

Each receiver 204 and 210 contains a tuner, amplifiers, filters; a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling command channel data carried by the forward command channel. As such, a single integrated circuit demodulates both subscriber requested information (audio and video) as well as command data.

The decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce composite video as well as a conventional television signal, e.g., modulated onto channel 3 or 4 using the NTSC standard modulation.

The conventional cable television signal receiver 224 contains a tuner and an analog (NTSC) demodulator. A multiplexer 226 couples the demodulated analog or decoded video signal to the display drive 222. Of course, the NTSC demodulator can be replaced with a PAL or SECAM standard demodulator, as needed.

The demodulated QPSK signal provides command and control information to the CPU 212 for generating certain graphics and control interface regions upon a television screen. The CPU is, for example, a Model 68302 processor manufactured by Motorola. This processor, operating in combination with the decoder 206 as well as a continuously available video signal from the information channel, produces screen displayed buttons, icons and graphical regions with which a subscriber interacts using the remote control. Without the video signal the set top terminal does not produce any display, i.e., the displays are actively generated in real time as needed to facilitate certain navigation functions.

Specifically, a joystick on the remote control selectively highlights certain pre-defined regions of the television screen. To perform such highlighting, a reference region is always highlighted when a menu is first displayed. From that reference region, direction vectors produced by the joystick are interpreted by the CPU to highlight a region lying in the direction in which the joystick was moved. When a desired selectable icon is highlighted, the subscriber depresses a "select" key on the remote that sends an infrared signal to an infrared receiver (a support circuit 216). This receiver sends the select command to the CPU for interpretation. The selected region is associated with a function. If the function is a request for specific information or a change in the menu, the processor formats the command and sends it to the back channel transmitter for transmission to the video session manager. If the command is a function that is handled locally such as volume control, the CPU implements the function within the set top terminal.

Since the session control commands are implemented by the video session manager and not the set top terminal alone, the number of available session control commands is infinite. Each command is implemented by the execution of an applet, as described below. The applets control both information sessions, e.g., the presentation of video to the television screen, and navigator functions, e.g., the menus that facilitate selection of a video program. As such, particular commands include,;but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation. Additionally, the CPU in the set top terminal implements certain local commands such as increment or decrement the volume, channel change, and on/off.

The invention is implemented as one or more interrelated "applets" which, when taken together, form the navigator of the present invention. The applets are transmitted, for the most part, to the set top terminal via the forward information channel. Certain information used by particular applets is transmitted to the set top terminal via a data stream propagated through the forward command channel. As such, the data stream carrying the applet is demodulated, the applet extracted and the applet's information decoded prior to execution that displays a menu on the display device. The detailed process by which an applet is downloaded and used to produce a menu is disclosed with respect to FIGS. 6 and 7 below.

Figure 3A:
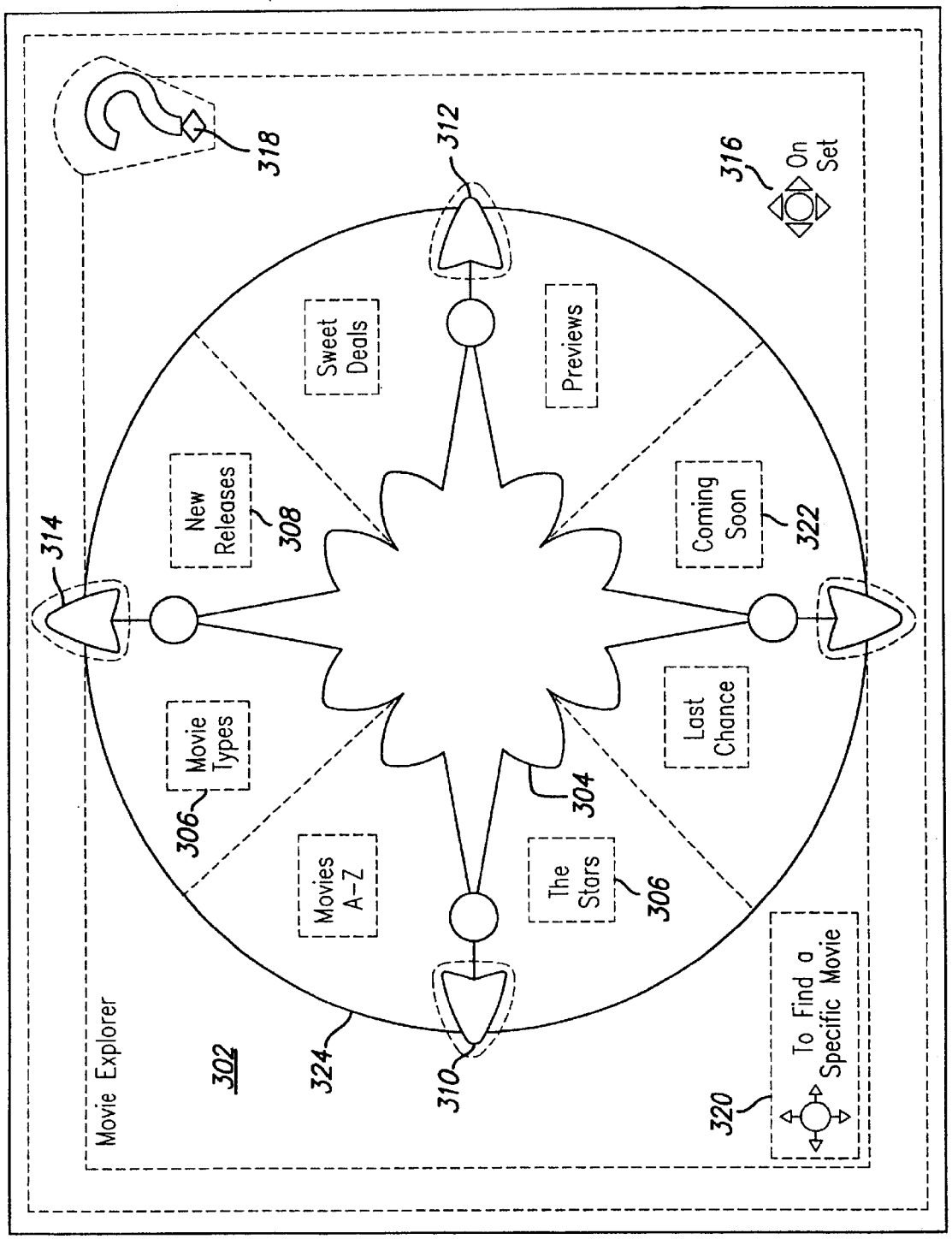
FIG. 3A depicts an illustrative "compass" menu display.

FIG. 3A depicts illustrative menu imagery (a "compass" menu screen 300) used to select movies available from the information distribution system. All the information, as well as control instructions, to produce such a menu is contained in an applet downloaded from the service provider equipment. As such, the service provider equipment stores the applets in server memory such that each applet can be rapidly recalled and routed to a set top terminal for display.

The illustrated menu screen 300 contains background video 302 that contains the menu structure. The background video also produces the text and other fixed graphics, e.g., the compass 304. An overlay or foreground video of typically transparent on-screen display (OSD) bitmap graphics 306 (shown in phantom proximate each user selectable graphic or icon) is positioned atop the background video 302. Typically, one region of the foreground video is highlighted to identify the present selectable menu region or icon. As shall be described below, these OSD graphics are produced and controlled by the OSD graphics processor within the video decoder in the set top terminal.

The background video comprises a video layer, while the overlay or foreground video comprises a graphics layer. The generation of both the video layer and graphics layer is controlled by a control layer. Briefly, the video layer comprises displayed video images produced using, e.g., information contained in an applet. The graphics layer comprises OSD overlay(s) including graphical objects that are associated with applets stored in either subscriber or provider equipment. The OSD overlay(s) are displayed over the video layer. The control layer comprises a command processing and logical operations layer. The control layer retrieves the applets associated with graphic layer objects selected by a user, executes the applets, and provides video information to the video layer and object information to the graphics layer.

The applet may also carry audio information that would "play" when a particular event occurred or specific menu object selected. Additionally, an animation object could be carried in the applet to allow certain objects to become animated when selected.

Generally, when a user selects a particular icon, the graphic object in the overlay plane is altered to de-emphasize or emphasize the icon or the video underlying the graphic object. In other words, the object is altered from one state to another state to facilitate the emphasis/de-emphasis of a particular region of the menu.

In one embodiment of the invention, when a user selects a highlighted icon, the OSD graphic proximate that icon is immediately altered to acknowledge the selection. The alteration is typically a change of color of the transparent overlay such that the icon "glows". To effectuate this OSD alteration, each menu field represented by.the region is defined by a pair of linked lists. One pair of linked lists in the menu is always active, i.e., there is always some region of the screen that is highlighted.

Alternatively, the OSD graphics may produce an opaque overlay that is made transparent (or partially transparent) when the region containing the overlay, or some other region, is selected. As such, the underlying video that lies beneath the overlay is revealed. Such a mask and reveal process enables the video to contain regions of imagery that are revealed upon selection, where these regions provide the user with recognizable and enjoyable information generally relating to the selection that was made or generally providing an enjoyable transition to the next screen. Furthermore, the mask and reveal process can be used to periodically mask and reveal certain imagery without the subscriber selecting any regions. This function may be used to merely provide a graphical enhancement to the display, i.e., emphasis and de-emphasis of particular menu regions.

The applet logic responds to the user commands entered through the remote control by activating different linked lists (i.e., moving a starting link pointer), or by adding, removing, or changing the mix of regions in the active list. The applet logic also tells the CPU which command sequence terminates the applet and which response to send to the video session manager. The applet logic contains a table of command sequences that are identified with specific coordinates defining the field locations on the menu.

The function of the navigator is generated through the use of Navigator descriptor files. These files are used as the basis for construction of all navigator applet screens. A navigator descriptor file defines specific objects (e.g., graphical bitmap, audio, animation and the like) to be used, their physical location on the navigator menu screen, and their interactions with the subscriber's remote control actions. The navigator asset builder software program uses the navigator descriptor files to generate the final pseudo MPEG bitstream that is sent to the set top terminal. The asset builder reads the objects as defined by the navigator asset builder and combines them with the appropriate control information also contained in the navigator descriptor files.

The navigator descriptor files are written in an HTML like language syntax specifically designed for this application. Each definition type starts with an angle bracket "<" immediately preceding the definition name. The definition type ends with an angle bracket, a forward slash "</" and then the definition name. Definitions can be nested. The navigator description file for building an applet having bitmap objects includes the following type definitions:

| | |
|---|---|
| REGION: | Lists all of the bitmaps that reside within an individual region on the screen, their specific locations within the region, and palette specific information for each bitmap, including transparency levels. |
| PALETTE: | Defines a palette of one or more colors, including transparency levels. |
| BUTTON: | Defines a control that appears as one or more previously defined bitmaps on the subscriber's television and can cause actions to take place (primarily messages sent upstream) when the subscriber presses the SELECT button on the remote control while the button is highlighted. |
| LIST: | Defines a control that consists of one or more bitmaps (usually a rectangular region of constant color) that is overwritten with TEXT sent from the upstream process and rasterized onto the region. Generally the text remains visible and the background colors change per subscriber selection. |
| STATIC: | Defines a control that consists of one bitmap (usually a rectangular region of constant color) into which upstream text is rastorize and made visible no matter what the subscriber selects with the remote control. |
| EDIT: | Defines a control that consists of one bitmap (usually a rectangular region of constant color) into which user entered text (as in numbers from the remote control are rasterized. The text generally remains visible for that entire applet. The background color changes as the subscriber selects or unselects the edit region. Edit controls also can exhibit the behavior that require a predefined number of characters to be entered by the subscriber through the remote control before any other buttons or controls can be actuated. |
| ACTION: | Messages that are formatted and sent upstream via the back channel when the subscriber presses the SELECT button while the corresponding ACTION control is highlighted. |

For example, a Navigator Descriptor File for a List Screen (LAZ) such as that which appears in FIG. 3B and whose operation is discussed with respect to FIG. 7 is structured as follows:

```
<SCREEN name=LAZ>
    ############ Define Regions ####################
    <REGION MIX=3>
        <BMP NAME=UpLevelInfo FILE=/ms/bmp/up_mme¯2 X=88
            Y=398 BG=O>
    </REGION>
        <BMP NAME=UpInfo FILE=/ms/bmp/listup¯2 X=88
            Y=398 BG=O>
    </REGION>
    <REGION MIX=3>
        <BMP NAME=Chop FILE=/dv/chopstr X=555 Y=394
            BG=14>
        <BMP NAME=ChopInfo FILE=/ms/bmp/chop_m¯2 X=88
            Y=398 BG=O>
    </REGION>
    </REGION MIX=2>
        <BMP NAME=Up FILE=/ms/bmp/list¯1 X=287 Y=166
            BG=O>
```

```
    <BMP NAME=line1 FILE=dv/line X=163 Y=205 BG=1>
    <BMP NAME=line2 FILE=/dv/line X=163 Y=236 BG=1>
    <BMP NAMB=line3 FILE=/dv/line X=163 Y=267 BG=1>
</REGION>
</REGION MIX=2>
    <BMP NAME=line4 FILE=/dv/line X=163 Y=298 BG=1>
</REGION>
</REGION MIX=2>
    <BMP NAME=line5 FILE=/dv/line X=163 Y=329 BG=1>
    <BMP NAME=line6 FILE=/dv/line X=163 Y=360 BG=1>
    <BMP NAME=ChopTop FILE=/dv/chopsttp X=555 Y=355
        BG=14>
</REGION>
<REGION>
    <BMP NAME=AEInfor FILE=/ms/bmp/list_a~1 X=88
        Y=392 BG=O>
</REGION>
<REGION>
    <BMP NAME=FJInfo FILE=/ms/bmp/list_f~1 X=88
        Y=392 BG=O>
</REGION>
<REGION>
    <BMP NAME=KOInfo FILE=/ms/bmp/list_k~1 X=88
        Y=392 BG=O>
</REGION>
<REGION>
    <BMP NAME=PTInfo FILE=/ms/bmp/list_p~1 X=88
        Y=392 BG=O>
</REGION>
<REGION>
    <BMP NAME=UZInfo FILE=/ms/bmp/list_u~2 X=88
        Y=392 BG=O>
</REGION>
<REGION>
    <BMP NAME=Down FILE=/ms/bmp/list_d~12 X=286
        Y=388 BG=O>
    <BMP NAME=DownInfo FILE=/ms/bmp/list_d~2 X=88
        Y=392 BG=O>
</REGION>
</REGION MIX=6>
    <BMP NAME=SAUSAGE FILE=/dv/sausage BG=14 X=178
        Y=53>
    <BMP NAME=AE FILE=/dv/ae BG=14 X=178 Y=53>
    <BMP NAME=FJ FILE=/dv/fj BG=14 X=178 Y=53>
    <BMP NAME=KO FILE=/dv/ko BG=14 X=178 Y=53>
    <BMP NAME=PT FILE=/dv/pt BG=14 X=178 Y=53>
    <BMP NAME=UZ FILE=/dv/uz BG=14 X=178 Y=53>
</REGION>
</REGION MIX=3>
    <BMP NAME=Help FILE=/ms/bmp helpst~1 X=555 Y=8
        BG=2>
</REGION>
<REGION>
    <BMP NAME=HelpInfo FILE=/ms/bmp/help_9~1 X=88
        Y=392 BG=O>
</REGION>
<REGION>
    <BMP NAME=ListInfo FILE=/ms/bmp/list_t~1 X=88
        Y=398 BG=O>
</REGION>
<REGION>
    <BMP NAME=UpLevel FILE=/ms/bmp/up_mme~1 X=274
        Y=24 BG=O>
####### Define Special Palettes #############
<PALETTE NAME=off>
    <RGB 0 150 150 TRANSPARENT>
    <RGB 0 0 0>
</PALETTE>
<PALETTE NAME=active>
    <RGB 0 255 179>
    <RGB 0 0 0>
</PALETTE>
</PALETTE NAME=BON>
    <RGB 255 255 255 TRANSPARENT
</PALETTE>
<PALETTE name=HighLite>
    <RGB 0 255 179>
    <RGB 0 0 0>
</PALETTE>
########## Define Controls ##############
<LISTBOX NAME=listbox ON=active OFF=off SEL-LISTSEL
FONT=0>
    <GOTO N=Up S=Down>
    <GOTO E=Chop>
    <TAB TYPE=CENTER STOP=188>
    <TAB TYPE=LEFT STOP=188>
    <ENTRY ASC=line1>
    <ENTRY ASC=line2>
    <ENTRY ASC=line3>
    <ENTRY ASC=line4>
    <ENTRY ASC=line5>
    <ENTRY ASC=line6>
    <FOCUS ASC=ListInfo ON=ListInfo>
    <ACTION MSG=SELECT>
        <FADE>
        <SENDSTRINGS LISTSEL>
    </ACTION>
</LISTBOX>
<BUTTON NAME=DOWN>
    <FOCUS ASC=Down ON=Down>
    <FOCUS ASC=DownInfo ON=DownInfo>
    <GOTO N=listbox E=Chop>
    <ACTION MSG=SELECT>
        <PGDOWN LIST=listbox>
    </ACTION>
</BUTTON>
<BUTTON NAME=Up>
    <FOCUS ASC=Up ON=Up>
    <FOCUS ASC=UpInfo ON=UpInfo>
    <GOTO S=listbox N=KO>
    <ACTION MSG=SELECT>
        <PGUP LIST=listbox>
    </ACTION>
</BUTTON>
<BUTTON NAME=UpLevel>
    <FOCUS ASC=UpLevel ON=UpLevel>
    <FOCUS ASC=UpLevelInfo ON=UpLevelInfo>
    <GOTO S=KO E=Help>
    <ACTION MSG=SELECT>
        <FADE>
        <TRANSITION DIR=U>
    </ACTION>
</BUTTON>
</BUTTON NAME=AE>
    <FOCUS ASC=SAUSAGE ON=BON>
    <FOCUS ASC=AE ON=HighLite>
    <FOCUS ASC=AEInfo ON=AEInfo>
    <GOTO S=Up E=FJ N=UpLevel>
    <ACTION MSG=SELECT>
        <SENDSTRINGS AE>
    </ACTION>
</BUTTON>
<BUTTON NAME=FJ
<FOCUS ASC=SAUSAGE ON=BON>
<FOCUS ASC=FJ ON=HighLite>
<FOCUS ASC=FJInfo ON=FJInfo>
<GOTO S=Up E=KO W=AE N=UpLevel>
<ACTION MSG=SELECT>
    <SENDSTRINGS FJ>
</ACTION>
<BUTTON>
<BUTTON NAME=KO>
    <FOCUS ASC=SAUSAGE ON=BON>
    <FOCUS ASC=KO ON=HighLite>
    <FOCUS ASC=KOInfo ON=KOInfd>
    <GOTO S=Up E=PT W=FJ N=UpLevel>
    <ACTION MSG=SELECT>
        <SENDSTRINGS KO>
    </ACTION>
</BUTTON>
<BUTTON NAME =PT>
    <FOCUS ASC=SAUSAGE ON=BON>
    <FOCUS ASC=PT ON=HighLite>
    <FOCUS ASC=PTInfo ON=PTInfo>
    <GOTO S=Up E=UZ W=KO N=UpLevel>
    <ACTION MSG=SELECT>
        <SENDSTRINGS PT>
```

-continued

```
        </ACTION>
    </BUTTON>
    <BUTTON NAME=UZ>
        <FOCUS ASC=SAUSAGE ON=BON>
        <FOCUS ASC=UZ ON=HighLite>
        <FOCUS ASC=UZInfo ON=UZInfo>
        <GOTO S=Up W=PT E=Help N=UpLevel>
        <ACTION MSG=SELECT>
            <SENDSTRINGS UZ>
        </ACTION>
    </BUTTON>
    <BUTTON NAME=Help>
        <FOCUS ASC=Help ON=Help>
        <FOCUS ASC=HelpInfo ON=HelpInfo>
        <GOTO W=UZ>
        <GOTO S=Chop>
        <ACTION MSG=SELECT>
            <FADE>
            <TRANSITION DST=HLS DIR=D>
        </ACTION>
    </BUTTON>
    <BUTTON NAME=Chop>
        <FOCUS Chop ASC=Chop ON=Chop>
        <FOCUS ChopInfo ASC=ChopInfo ON=ChopInfo>
        <FOCUS ChopTop ASC=ChopTop ON=ChopTop>
        <GOTO W=Down>
        <GOTO N=Help>
        <ACTION MSG=SELECT>
            <FADE>
            <TRANSITION DST=MME DIR=J>
        </ACTION>
    </BUTTON>
</SCREEN>
```

Figure 8:
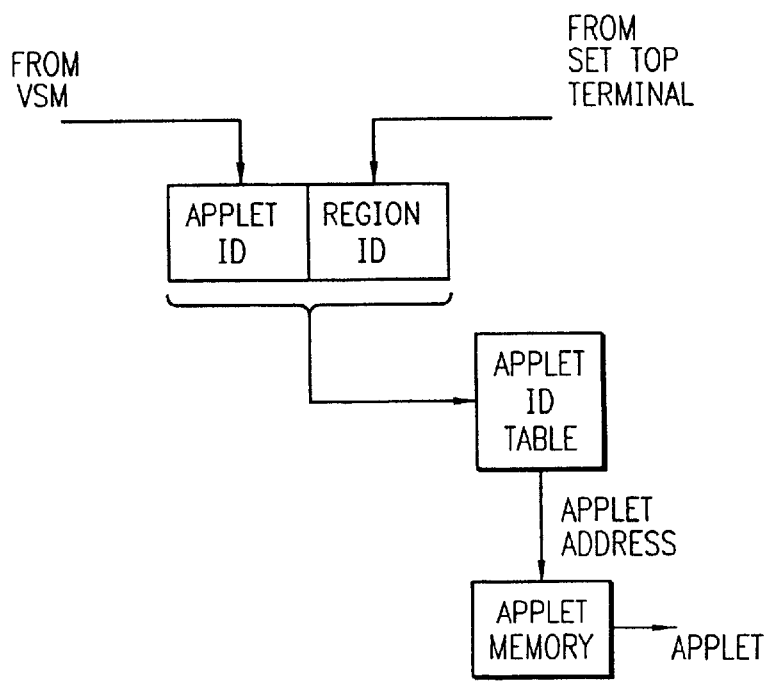
FIG. 8 depicts a flow process for retrieving and transmitting an applet.

As shown in FIG. 8, an address (region ID) identifying the selected region is transmitted to the video session manager. The video session manager concatenates the region address with an address of the applet within which the region selection was made. The concatenated address is used to identify an entry (an applet ID) in an applet table. This applet ID indicates the applet that is to be sent to fulfill the'subscriber's request. The AID may also identify a movie or other multimedia information that is to be transmitted. The specific applet routine identified by the applet ID is recalled from memory and forwarded to the set top terminal for execution. The set top terminal then performs a function identified by the applet, e.g., decode the signals with assets (applet decoding), decode signals without assets (decode applet without any controls except return), decode movie from beginning, or decode movie from middle. As such, the set top terminal does not perform any high level functions, the terminal, in most instances, merely functions as a video decoder and command interpreter.

Returning to FIG. 3A, each menu is linked to other menus as a linked list such that selection of a particular icon results in another applet being downloaded and another menu being generated. In addition to textual icons, the menu 300 contains a "compass" 304. This compass forms a "spatial mnemonic" through which a subscriber navigates through the various menu screens. For example, the east and west arrows (310 and 312) link to menus that are conceptually lateral to the present menu. Such menus that are lateral to, for example, the movie explorer menu 300 are new movie promotional clips and a special interest list menu. The north arrow 314 links to a previous menu. The south arrow is generally non-functional in the particular menu shown. Other icons on the menu 300 include a help icon 318 and a current highlighted region description area 320. As such, area 320 provides a short description of the presently highlighted region, e.g., the explanation of "Movies A–Z" is shown. Selecting region 324 executes an applet that produces a "list menu", as described with respect to FIG. 4 and 19 below. Other icons link to short multimedia "clips". For example, the "Coming Soon" icon 322 links to a series of promotional clips or graphics that advertise movies that will soon be available. The "On Set" icon 316, when selected, leads back to the initial menu into the navigator or some other high level point in the navigator tree. The "On Set" icon appears on every menu to provide an direct link to a higher level of the navigator from any menu.

For example, selecting the "Movies A–Z" textual icon 324 links to an alphabetical menu (see menu 400 of FIG. 4) that presents an alphabetical list 402 of all the available movies. The accurate menu region 404 contains a plurality of alphabetic ranged segments $406_n$ (where n is an integer value) that, when selected, presents a menu list containing the movie titles in the selected alphabetic range. The subscriber can then scroll through the alphabetical list 402 using the up arrow icon 402 to move to a previous page of movies and the down arrow 408 to move to a following page. Manipulating the joystick will sequentially highlight the movie titles until a desired title is highlighted. Selecting a name of a movie causes that movie to be sent to the set top terminal for presentation. The left and right arrows 410 and 412 move to similar lists in parallel menus, e.g., moving from an alphabetical list of comedies may move to an alphabetical list of dramas and so on. When an arrow (or any icon) is highlighted, a move identifier area 320 presents a short description of the menu that will be presented if that icon is selected.

Prior to completing a transaction for purchase of a movie or other service, other applets are downloaded to the set top terminal which form menus stating the price of the selection, confirming the selection, showing a preview prior to purchase, and the like.

Figure 5:
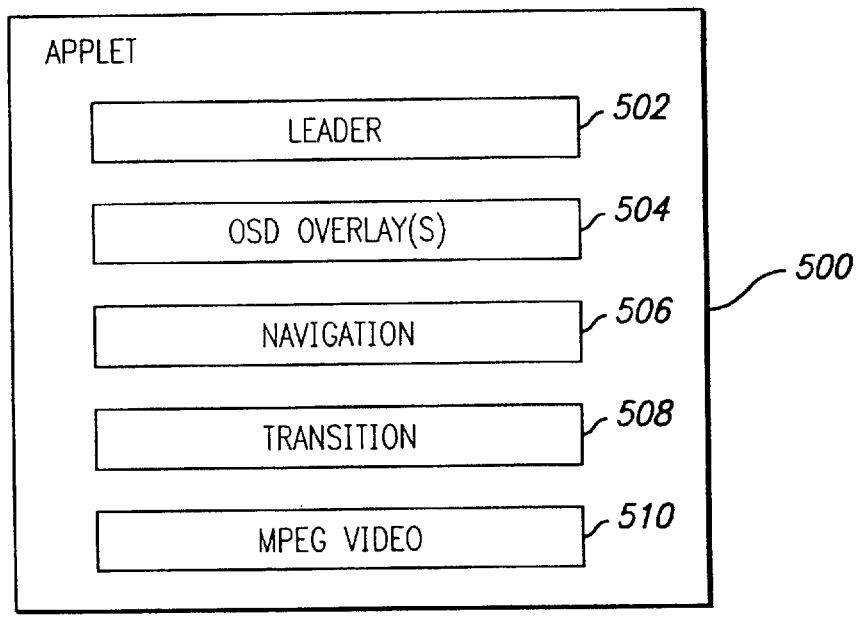
FIG. 5 depicts a schematic illustration of the contents of an applet.

FIG. 5 depicts a schematic diagram of the contents of the portion of an applet 500 that is transmitted via the information channel to implement each of the menus. Separately, the descriptor file is transmitted via the command channel (or alternatively the information channel) such that the functions of the applet can be implemented. A descriptor file for each menu may be transmitted and stored (or prestored) in the set top terminal. Specifically, the applet 500 contains a leader 502, OSD overlay graphics 504, navigator control instructions 506, transition signal 508, and compressed (e.g., MPEG) background video 510. As such, upon selection of an icon in a given menu, an applet for the linked menu is transmitted from server to the set top terminal. That applet carries the background video and the OSD overlays as well as all instructions necessary to implement the functions of the menu. The video session manager maintains the linked list (menu tree) of applet interrelations such that when the set top terminal sends a command via the back channel, the video session manager interprets the command and causes the server to send the appropriate applet. The applet begins with the leader 502 which is followed by the OSD overlays 502 which are decoded by the OSD decoder while the remainder of the applet is being processed. The navigation control instructions 504 facilitate overlay activation and transition control. The transition signal is generally a packet that identifies the end of the navigator information and the beginning of the new MPEG video. Lastly, the new MPEG video signal is sent and presented in combination with the OSD graphics. At some point in the menu structure, the subscriber selects a movie title and the video session manager causes the server to send the selected movie.

Figure 6B:
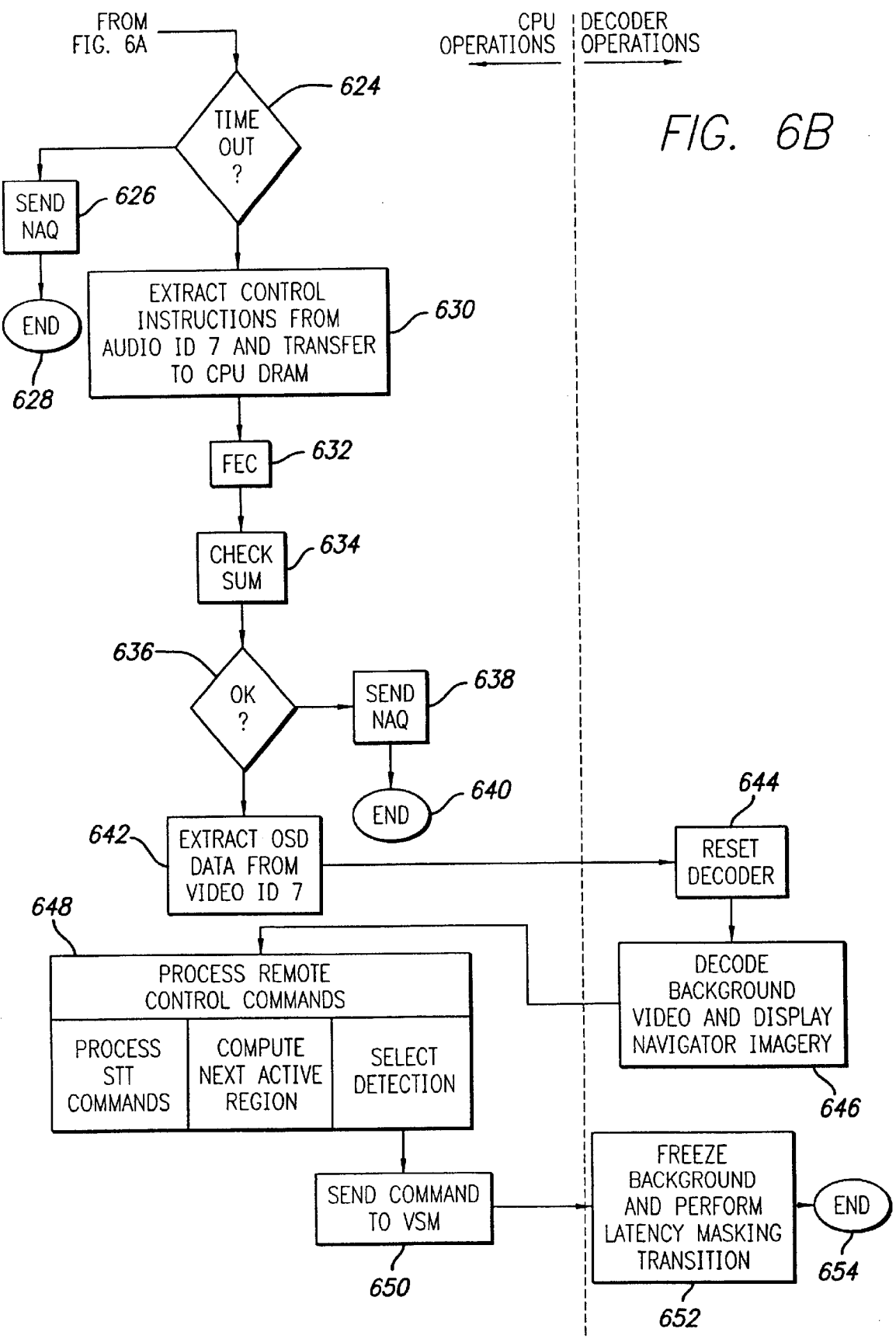

FIG. 6 depicts the appropriate alignment of FIGS. 6A and 6B. These figures, taken together, depict an applet transmission and execution routine 600. The diagram depicts the portion of the routine handled by the CPU on the left and the portion of the routine handled by the OSD decoder on the right. The CPU primarily handles control layer functions, while the OSD decoder primarily handles graphics layer functions. The routine 600 begins with step 602 and proceeds to step 604. The CPU detects, at step 604, the type of transmission being received. Specifically, the CPU detects whether the transmission is a movie or a navigator applet. An applet is identified by the packet containing a particular stream identification code. If the transmission is a movie, the video decoder begins, at step 606, decoding the movie. The movie decoding process is controlled by the CPU via step 656. At step 656, the CPU processes any movie presentation control commands generated by the remote control. As such, the CPU sends, at step 658, the presentation control command to the video session manager to facilitate changing the presentation. The routine ends at step 660.

If, at step 604, an applet is detected, the routine awaits, at step 608, for the applet leader. At step 610 and 612, the set top terminal CPU initializes the decoder and sets certain buffer pointers. To process these applet components, the CPU must store the OSD graphics and the instructions in special memory locations. As such, at steps 610 and 612, the CPU initializes the decoder. The OSD data is delimited by a user packet that indicates that the OSD data download is complete. Further, the CPU sets a input buffer pointer to an OSD region of the decoder DRAM. As such, all video packets are routed to the OSD region of the memory. Similarly, the set top terminal CPU initializes the decoder to detect applet information and transfer the data to the CPU DRAM for execution.

At step 616, the routine queries whether an excessive amount of time has elapsed between detection of an applet and reception of the applet. If the query is affirmatively answered, the set top terminal sends, at step 618, a negative acknowledgment (NAQ) signal through the back channel to the video session manager. The routine ends at step 620. Upon receiving the NAQ signal, the video session manager will resend the applet.

If the query at step 616 is negatively answered, the routine proceeds to step 622. At step 618, the set top terminal begins receiving the applet, i.e., the CPU detects the user data packet. At step 624, the routine queries whether an excessive amount of time has elapsed between detection of a user data packet and reception of the data. If the query is affirmatively answered, the set top terminal sends, at step 626, a negative acknowledgment (NAQ) signal through the back channel to the video session manager. The routine ends at step 628. Upon receiving the NAQ signal, the video session manager will resend the applet.

At step 630, the control instructions within applet packets are extracted from the packets and stored in the CPU DRAM. At step 632, forward error correction is performed on the extracted bits. Additionally, at step 634, a check sum is created to ensure that the extracted control instructions are correct. At step 636, the CPU queries whether the check sum was correct. If the check sum is correct, the routine proceeds to step 6342. However, if the query is negatively answered, the routine sends a NAQ to the video session manager and ends at step 640 to await retransmission of the applet.

At step 642, the OSD data within packets having an OSD identity are extracted from the packets and stored in the OSD region of memory. The payload of these packets is one or more bitmap images to be used by the applet. The OSD images are loaded directly into the start of the OSD data space. Subsequent packets with the OSD identity contain consecutive portions of the OSD image(s). An OSD image compiler leaves space at the beginning of each packet for actual MPEG synchronization codes. To indicate the end of the OSD transmission, a "user data" packet of up to 96 bytes in length is inserted into the video stream between the OSD packet stream and the background video stream.

At step 644, the CPU resets the video decoder to enable it to receive the background video transmission. At step 646, the video decoder begins to decode the background video and display that navigator imagery to the subscriber. The OSD overlays are also processed by the decoder and displayed in accordance with the descriptor file for the menu being displayed.

At step 648, the routine processes navigator commands from the remote control. These commands include all those associated with an applet with assets as well as an applet without assets. Note that an applet without assets has a single return button displayed for selection. Thus, the joystick is disabled, but the select function operates in the same manner as an applet with assets. At step 648, the CPU processes the three types of navigator commands: local set top terminal commands such as on/off, volume, channel selection; joystick directional vectors; and region selection. The vectors are processed to determine which region should next be highlighted. When a selection is made, the CPU sends, at step 650, a command to the video session manager to facilitate the transmission of a movie or applet.

At step 652, to facilitate a transition, the routine freezes the background video and prepares the set top terminal for the next applet or video transmission. In addition, the CPU executes a latency masking process as disclosed in commonly assigned U.S. Pat. No. 5,781,227 issued Jul. 14, 1998. The applet ends at step 654.

Although many OSD graphics are sent within the data stream through the forward information channel, some OSD graphics are transmitted to the set top terminal through the command channel. Specifically, so-called "list screen" data is sent through the command channel. This data contains a textual list of characters to be used in a menu and is transmitted in ASCII form at the beginning of an applet transmission. The CPU converts the ASCII character list into OSD bitmap images and stores those images for subsequent use.

Figure 3B:
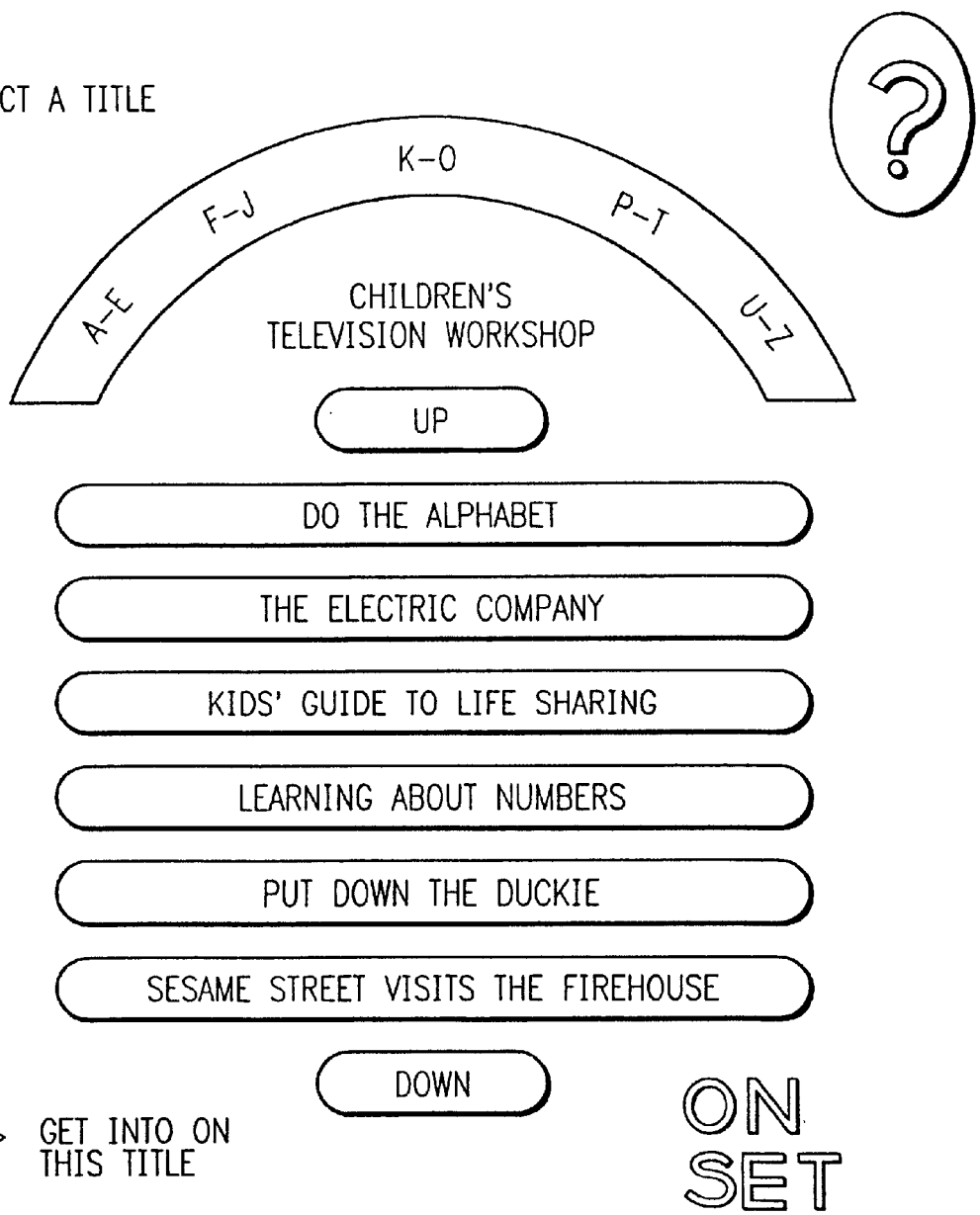
FIG. 3B depicts a first illustrative "list" menu display containing a text list of selections.
Figure 4:
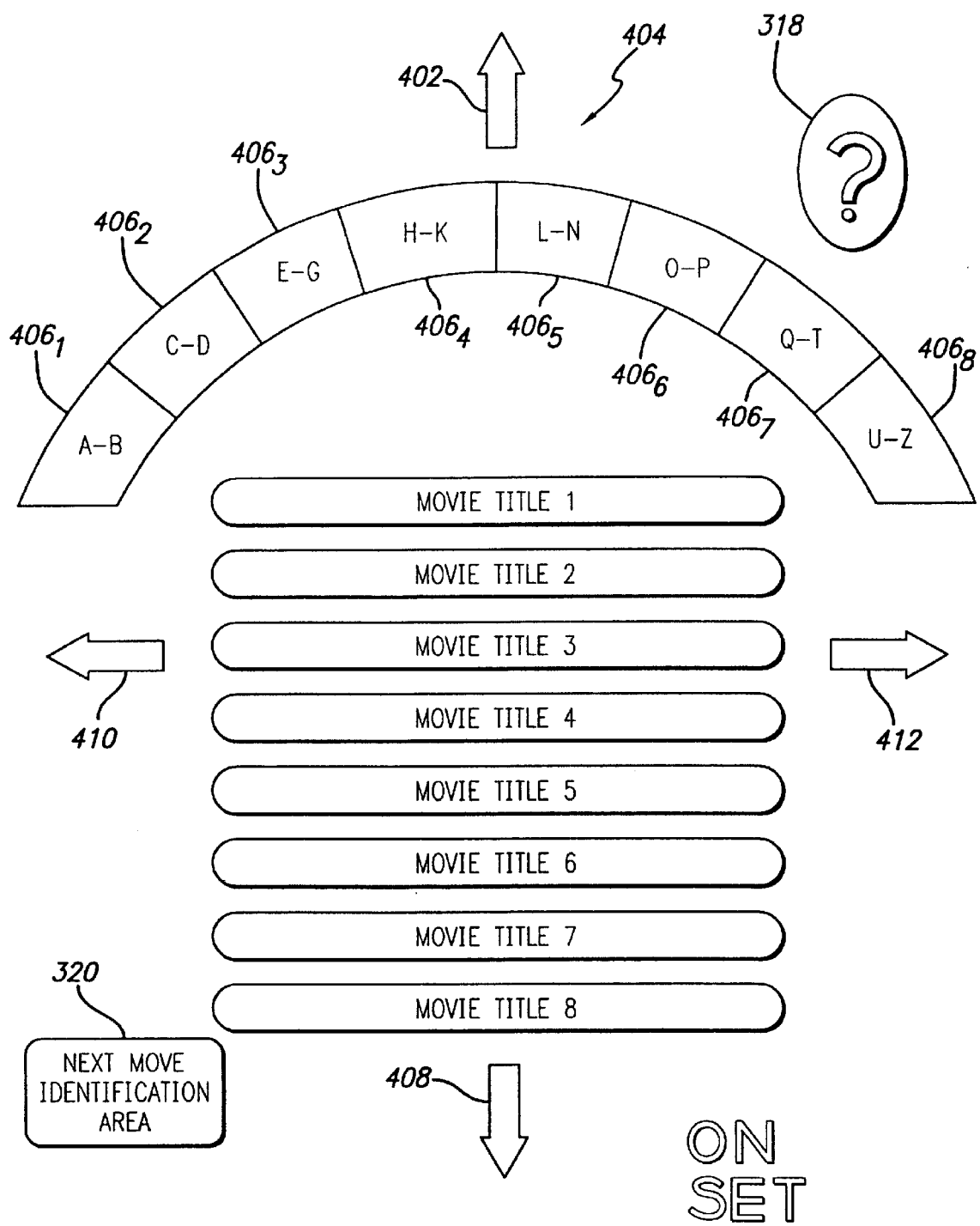
FIG. 4 depicts a second illustrative "list" menu display containing a text list of selections.

FIG. 7 depicts a flow diagram of a list information processing routine 700 for generating a list menu such as those depicted in FIG. 3B and 4. The routine is executed by the CPU upon requesting a list menu. The routine begins at step 702 and proceeds to step 704. At step 704, the CPU receives a list menu from the service provider. The menu applet contains an instruction for the CPU to display page 0 of list text that forms the menu. The list text an ASCII page of text. The page 0 request is processed at step 706. At step 708, the routine queries whether page 0 is available in the CPU cache. If the query is negatively answered, the CPU requests the page 0 text from the service provider and awaits its arrival. If page 0 is available in the cache, the CPU retrieves and uses the cached page to generate the text menu (at step 711). The CPU converts the ASCII text into one or more OSD bitmap images using an EEPROM based font and kerning table. The CPU stores the OSD bitmap in the CPU DRAM. As the OSD lists are displayed, the CPU moves the necessary OSD graphic images to the video decoder OSD memory. The list menu is in the form of that shown in FIG. 4.

Such display is performed on a paginated basis. At step 712, the CPU monitors the remote control for a new selection, e.g., up arrow, down arrow, and select a particular region. If a down arrow is selected, the routine proceeds to step 714. At step 714, the routine queries whether the display is presently showing the last page of the list menu. If the query is affirmatively answered, the routine returns to step 712. If the query at step 714 is negatively answered, the routine proceeds to step 716 to determine whether the next subsequent page is cached. If the page is not cached, the CPU requests, at step 718, the next page from the service provider. The new page is used to form and display a list menu at step 719. Similarly, if an up arrow is selected, the routine checks if the previous page is in cache. If the page is in cache, the CPU uses the cached page. However, if the page is not available, the CPU requests the service provider to send the page.

If, at step 712, the routine detects that a region other than an up or down arrow is selected, the routine proceeds to step 722. At step 724, the routine processes the region selection in the same manner as described above for processing and displaying a new menu that is identified by the region selected. The routine ends at step 726.

The method and apparatus of the present invention provide an interactive menu structure (navigator) for an information distribution system such as a video-on-demand system. The navigator provides an enjoyable, interactive experience with full motion background video and active graphics that indicate when a selection is made by altering their appearance. All this functionality is brought to the set top terminal within an applet for each displayed menu. Consequently, the set top terminal does not require an expensive processor nor a large amount of memory. As such, the invention allows the set top terminal in an information distribution system to remain relatively inexpensive.

Figure 9A:
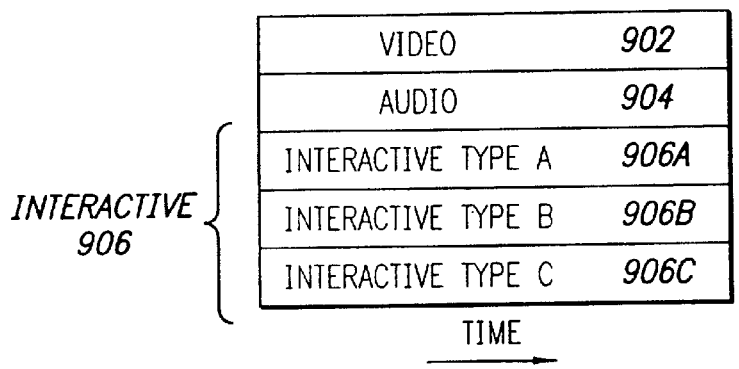
FIG. 9A depicts a schematic of a first multimedia stream providing support for multiple types of subscriber terminals according to a preferred embodiment of the present invention.

FIG. 9A depicts a schematic (not to scale) of a first multimedia stream providing support for multiple types of subscriber terminals 1212 according to a preferred embodiment of the present invention. The schematic illustrates the time-multiplexed content of the multimedia stream with time running from left to right in the illustration. The multimedia stream may be compatible with the MPEG-2 standard such that the multimedia stream comprises an MPEG-2 transport stream.

As shown in the illustration, a video stream 902, an audio stream 904, and an interactive stream 906 are time-multiplexed together to form the multimedia stream. Of course, the various streams are not shown to scale. For example, the video stream 902 would typically be much larger than shown relative to the audio 904 and interactive 906 streams.

The video stream 902 may, for example, be compatible with the MPEG-2 standard such that the video stream 902 comprises MPEG-2 encoded video data. The encoded video data is typically transported in fixed-length packets, but in the alternative may be transported in variable-length packets. Also alternatively, the video stream 902 may be of a format different from MPEG-2. For example, the video stream 902 may comprise wavelet encoded video data.

The audio stream 904 may, for example, comprise encoded audio data which is compatible with the Dolby AC-3 standard. Such encoded audio data would include stereo and multichannel sound. Alternatively, the audio stream 904 may be of a format different from AC-3.

The interactive stream 906 comprises packets of interactive data 906A–C specific to different types of subscriber terminals. FIG. 9A shows an interactive stream 906 that supports three types (A, B, and C) of subscriber terminals 1212. The interactive data 906A–C are time-multiplexed (interleaved in time) for parallel transmission. In other words, the subset of the overall bit rate for the multiplexed data stream 1008 which is allocated to the interactive data stream 906 may be suballocated to the different types of subscriber terminals 1212A–C.

The packets of interactive data 906A–C are identified by packet identifiers (PIDs). Packets corresponding to type A terminals would have a first PID; packets corresponding to type B terminals would have a second PID; and packets corresponding to type C terminals would have a third PID. An MPEG-2 compatible embodiment of the present invention would use 13-bit PIDs and assign them using program specific information (PSI).

The present invention also contemplates an interactive stream 906 supporting any number (two, three, four, five, six, seven, and so on) of different types of subscriber terminals 1212. In addition, the present invention contemplates that two or more subscriber terminals, although made by different manufacturers, may both qualify as a particular type of terminal. This may happen, for instance, when the two terminals are similar due to the same chip sets being used therein.

Furthermore, the present invention contemplates that the interactive data 906A–C do not have to be time-multiplexed in the particular parallel fashion that is illustrated in FIG. 9A. As shown, for example, by the streams in FIGS. 9B and 9C, the multiplexing can be done in a variety of ways. This allows the interactive data 906 to be multiplexed in a means most suitable for the subscriber terminals 1212 to retrieve it.

Figure 13:
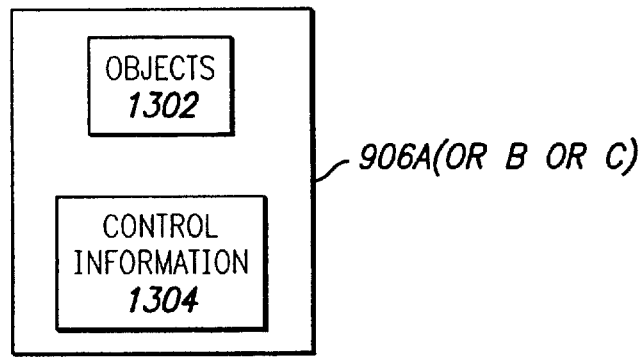
FIG. 13 depicts interactive data of FIGS. 9A–9C in further detail.

FIG. 13 depicts the interactive data 906A–C in further detail. The interactive data 906A–C each comprise data specific to a type of subscriber terminal 1212. The data includes objects 1302 and control information 1304.

The objects 1302 correspond to buttons, list boxes, animation and the like. For example, such objects 1302 would include the east and west arrows (310 and 312) in FIG. 3A, and the alphabetical list 402 in FIG. 4. The objects 1302 are typically user selectable.

The objects 1302 may vary depending on the type of subscriber terminal. The variance in the objects 1302 may be, for example, in the number bits per pixel, the format of the palettes, the size or resolution of the bitmap, the screen coordinates of the objects, user input differences, or other differences. For instance, type A subscriber terminal due to its higher resolution may require a different bitmap than the bitmap that type B and type C subscriber terminals due to their lower resolution may require.

In accordance with the present invention, a first version of an object 1302 which is customized for type A terminals would be included in a first packet of interactive data 906A; a second version of an object 1302 which is customized for type B terminals would be included in a second packet of interactive data 906B; and a third version of an object 1302 which is customized for type C terminals would be included in a third packet of interactive data 906C.

The control information 1304 corresponds to the behavior of the objects 1302. For example, one behavior is the action which can be initiated by user selection of a highlighted object 1302. Another behavior is to which other object 1302 a user is transferred when an arrow button (up, down, left, or right) on a remote control 138 is hit.

Figure 9B:
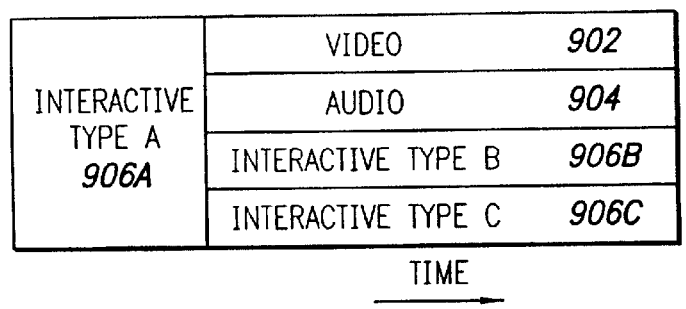
FIG. 9B depicts a schematic of a second multimedia stream providing support for multiple types of subscriber terminals according to a preferred embodiment of the present invention.

FIG. 9B depicts a schematic (not to scale) of a second multimedia stream providing support for multiple types of subscriber terminals 1212 according to a preferred embodiment of the present invention. The multimedia stream in FIG. 9B is similar to the stream in FIG. 9A, except that the interactive data 906A for a particular type (e.g., type A) of subscriber terminal 1212 is transmitted in series before the video stream 902, the audio stream 904, and the rest of the interactive stream 906 is transmitted in parallel. This may be desirable to accommodate and/or take advantage of the capability of a particular type (e.g., type A) of subscriber terminal to quickly receive the interactive data 906A before receiving the video and audio streams 902 and 904.

Figure 9C:
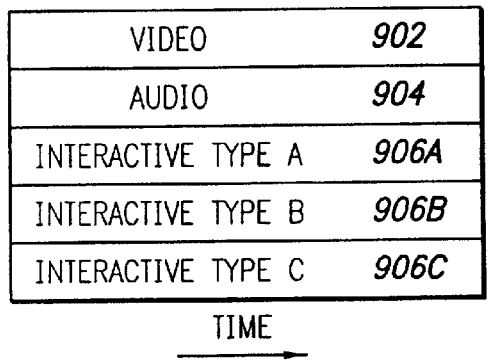
FIG. 9C depicts a schematic of a third multimedia stream providing support for multiple types of subscriber terminals according to a preferred embodiment of the present invention.

FIG. 9C depicts a schematic (not to scale) of a third multimedia stream providing support for multiple types of subscriber terminals according to a preferred embodiment of the present invention. The multimedia stream in FIG. 9C is similar to the stream in FIG. 9A, except that the bandwidth suballocated to the interactive data 906A for type A terminals 1212A is larger relative to the bandwidth suballocated to the interactive data (906B and C) for type B and C terminals (1212B and C). The multimedia stream in FIG. 9C may be useful if the type A terminals 1212A are able to retrieve and utilize the interactive data 906A faster than the type B and C terminals (1212B and C) are able to retrieve their interactive data (906B and C).

Figure 10:
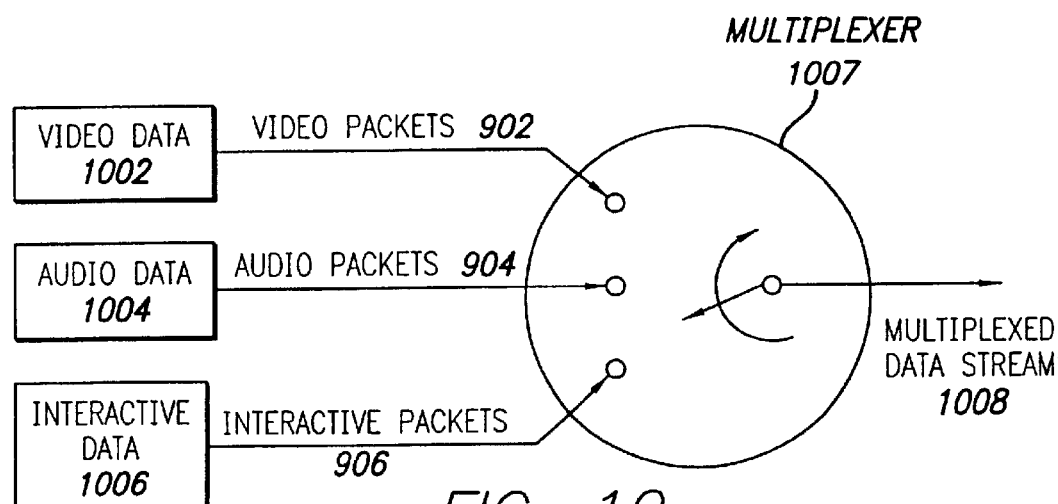
FIG. 10 depicts a schematic of the multiplexing of video, audio, and interactive data according to a preferred embodiment of the present invention.

FIG. 10 depicts a schematic of the multiplexing of video, audio, and interactive data according to a preferred embodiment of the present invention. The video data source 1002 supplies the video data packets for the video stream 902; the audio data source 1004 supplies the audio data packets for the audio stream 904; and the interactive data source 1006 supplies the interactive data packets for the interactive data stream 906. A multiplexer 1007, depicted schematically in FIG. 10 for purposes of illustration, multiplexes the three streams 902, 904, and 906 together to form a multiplexed data stream 1008.

Figure 12A:
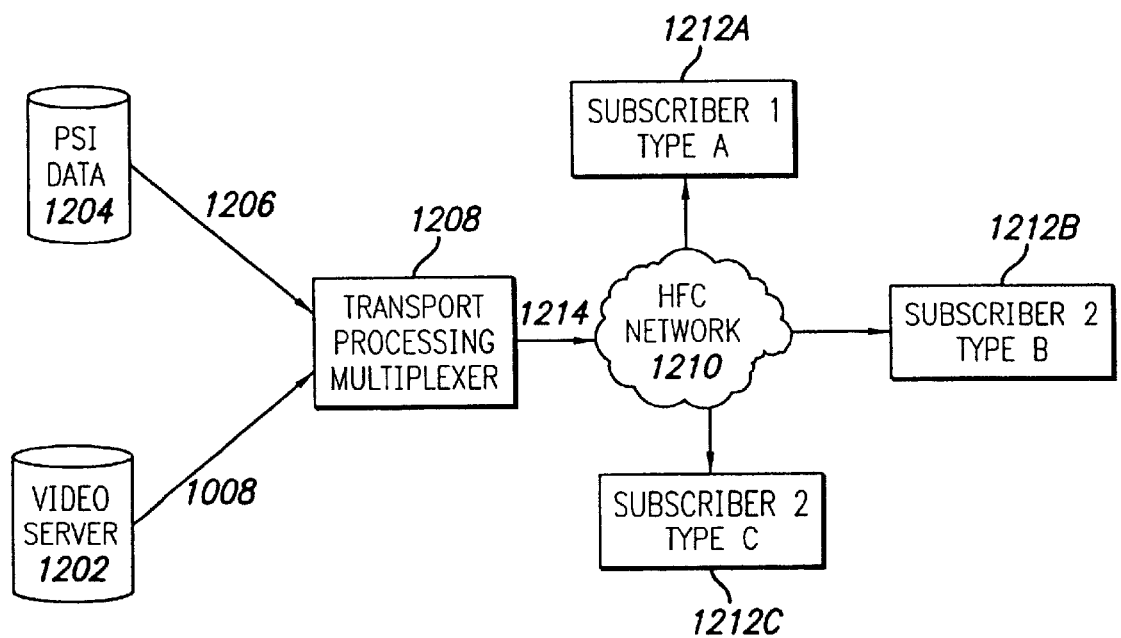
FIG. 12A depicts a first block diagram of a system for distributing video data while supporting multiple types of subscriber terminals according to an embodiment of the present invention.
Figure 12B:
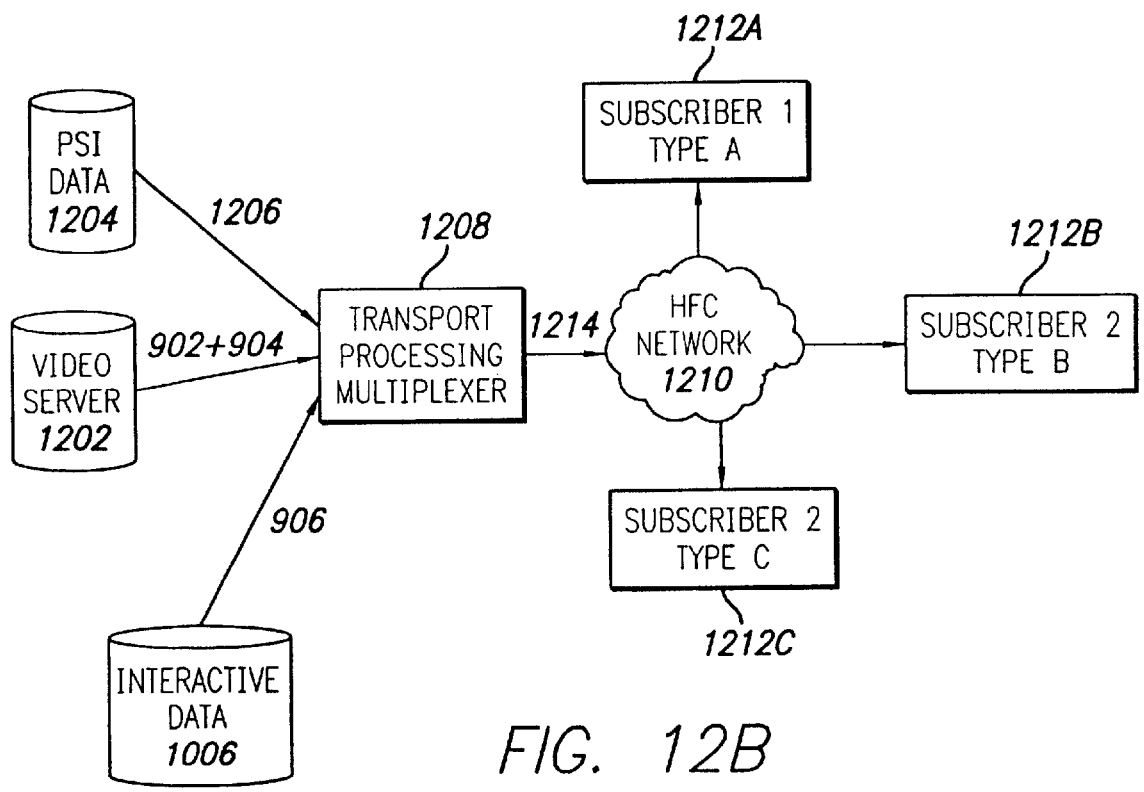
FIG. 12B depicts a second block diagram of a system for distributing video data while supporting multiple types of subscriber terminals according to a preferred embodiment of the present invention.

In one embodiment of the present invention, the multiplexer 1007 is included as part of a video server 1202 as shown in FIG. 12A which is described below. In another embodiment of the present invention, the multiplexer 1007 is included as part of the transport processing multiplexer 1208 as shown in FIG. 12B which is described below.

Figure 11:
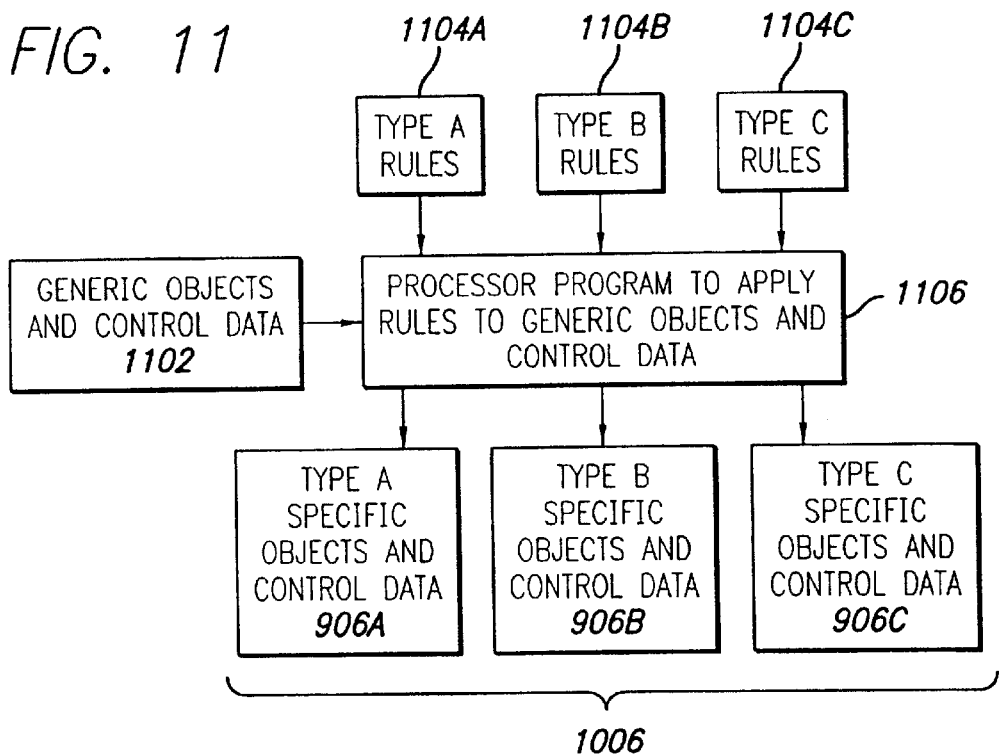
FIG. 11 depicts a block diagram of the generation of the interactive data which provides support for multiple types of subscriber terminals according to a preferred embodiment of the present invention.

FIG. 11 depicts a block diagram of the generation of the interactive data which provides support for multiple types of subscriber terminals according to a preferred embodiment of the present invention. The interactive data in the interactive data source 1006 is generated by the process illustrated in FIG. 11.

In one embodiment of the present invention, the process in FIG. 11 generates the interactive data for a particular Navigator screen. The process begins with generic definitions 1102 of objects and control information for the particular Navigator screen. The process also utilizes sets of rules 1104A–C specific to the different types (A–C) of subscriber terminals. The sets of rules 1104A–C contain rules that correspond to the variances which are specific to the terminal types A–C.

A processor program 1106 applies the rules 1104A–C to the generic objects and generic control information 1102. By doing so, the processor 1106 generates a plurality of interactive data files 906A–C. An interactive data file 906A (or B or C) includes interactive data that is customized to a specific type of subscriber terminal A (or B or C).

In one embodiment of the present invention, each interactive data file 906A (or B or C) includes the interactive data for a single Navigator screen. In another embodiment, each interactive data file 906A (or B or C) may include the interactive data for a plurality of Navigator screens. In either case, the interactive data source 1006 in FIG. 10 comprises the various interactive data files 906A–C.

In an alternative embodiment of the present invention, the rules 1104A–C may be included within the processor program 1106.

The present invention contemplates that a particular type of subscriber terminal 1212A (or B or C) may require or be able to utilize additional objects 1302 that are not among the generic objects 1102. In such a case, the present invention contemplates that the corresponding set of rules 1104A (or B or C) may include said additional objects 1302, along with the control information pertaining thereto.

FIG. 12A depicts a first block diagram of a system for distributing video data while supporting multiple types of subscriber terminals according to an embodiment of the present invention. The system comprises a video server 1202, a source of program specific Information (PSI) data 1204, a transport processing multiplexer (TPM) 1208, a hybrid-fiber coax (HFC) distribution network 1210, and a plurality of subscriber terminals of different types 1212A–C. The video server 1202 relates to the information server 108 in FIG. 1. The HFC network 1210 relates to the cable transport system 104 in FIG. 1. The subscriber terminals 1212 relate to the set top terminals 136, but may also be integrated with the display device 140, or a computer, or another product.

In this embodiment, the video server 1202 includes the video data source 1002, the audio data source 1004, the interactive data source 1006, and the multiplexer 1007. In other words, the video server 1202 includes that which is shown in FIG. 10. As such, the video server 1202 outputs the multiplexed data stream 1008. In one implementation of this embodiment, the multiplexing of the video, audio, and interactive data (1002, 1004, and 1006) may be done before hand and the result stored in the video server 1202. Such an implementation may be particularly appropriate for a video on demand application.

The PSI data source 1204 outputs PSI data 1206. The PSI data 1206 includes the assignment of packet identifiers (PIDs) to interactive packets 906 for the various types of subscriber terminals 1212A–C.

The TPM 1208 receives as input both the multiplexed data stream 1008 and the PSI data 1206. The TPM 1208 multiplexes as appropriate the multiplexed data stream 1008 and the PSI data 1206 to form a transport stream 1214 and sends the transport stream 1214 via the HFC network 1210 to the plurality of subscriber terminals of different types 1212A–C.

When a subscriber terminal 1212A (or B or C) receives the transport stream 1214, the terminal 1212A (or B or C) decodes certain data packets and presents the information therein on the display device 140. The terminal 1212A (or B or C) decodes and presents only such interactive data packets which are indicated by the PSI data 1206 as corresponding to that type of terminal. As discussed above, the assignment of the interactive data packets to the different types of terminals is implemented using packet identifiers (PIDs).

FIG. 12B depicts a second block diagram of a system for distributing video data while supporting multiple types of subscriber terminals according to a preferred embodiment of the present invention. The system in FIG. 12B differs from the system in FIG. 12A in that the interactive data source 1006 is separate from the video server 1202, and the output of the video server 1202 includes the video and audio data streams (902 and 904) but not the interactive data stream 906.

The separate interactive data source 1006 outputs the interactive data stream 906 directly to the TPM 1208. The TPM 1208 under control of the video session manager 122 injects the interactive data stream 906 dynamically in real time into the transport stream 1214.

The above description is included to illustrate the operation of the preferred embodiments and is not meant to limit the scope of the invention. The scope of the invention is to be limited only by the following claims. From the above description, many variations will be apparent to one skilled in the art that would yet be encompassed by the spirit and scope of the invention.

What is claimed is:

1. A multimedia data stream for transmitting a multimedia signal and interactive data to support multiple types of subscriber terminals, the data stream comprising:

a first component stream including a first media signal;

a second component stream including a second media signal, the second component stream being multiplexed with the first component stream;

a third component stream including a first interactive data and a second interactive data, the third component stream being multiplexed with the first and second component streams;

where the first interactive data includes data specific to applets associated with a first type of subscriber terminal; and where the second interactive data Includes data specific to applets associated with a second type of subscriber terminal.

2. The multimedia data stream of claim 1, wherein:

the data stream comprises data packets;

the first interactive data is identified by a first packet identifier (PID);

the first type of subscriber terminal decodes packets identified by the first PID;

the second interactive data is identified by a second PID; and the second type of subscriber terminal decodes packets identified by the second PID.

3. The multimedia stream of claim 1, wherein:

the first interactive data comprises screen objects modified specifically for use with the first type of subscriber terminal; and the second interactive data comprises screen objects modified specifically for use with the second type of subscriber terminal.

4. The multimedia stream of claim 3, wherein:

the first interactive data further comprises control data modified specifically for use with the first type of subscriber terminal; and the second interactive data further comprises control data modified specifically for use with the second type of subscriber terminal.

5. The multimedia stream of claim 3, wherein modifications to the screen objects include a modification of a bitmap of a screen object.

6. The multimedia stream of claim 3, wherein modifications to the screen objects include a modification to a palette.

7. The multimedia stream of claim 3, wherein modifications to the screen objects include a modification of screen coordinates of a screen object.

8. The multimedia stream of claim 4, wherein modifications to the control data include a modification to a menu selection structure.

9. The multimedia stream of claim 1, wherein the first and second interactive data are pre-generated well before transmission of the multimedia stream.

10. The multimedia stream of claim 1, wherein the first media signal comprises compressed video data and the second media signal comprises audio data.

11. The multimedia stream of claim 1, where the multimedia stream is transmitted to the first and second types of subscriber terminal via a bidirectional transport system.

12. The multimedia stream of claim 11, where the multimedia stream comprises a MPEG transport stream.

13. The multimedia stream of claim 11, wherein:

the first type of subscriber terminal includes a first type of set top terminal; and the second type of subscriber terminal includes a second type of set top terminal.

14. A method for providing interactive support to multiple types of subscriber terminals, the method comprising:

providing an input file including definitions of generic screen objects and generic control data relating to the screen objects;

providing a first set of applets having a first set of rules including modifications to the screen objects specific to a first type of subscriber terminal;

providing a second set of applets having a second set of rules including modifications to the screen objects specific to a second type of subscriber terminal;

identifying the first set of applets in response to a request by the first type of subscriber terminal;

processing the input file by applying the first set of rules to generate a first output file, the first output file including definitions specific to the first type of subscriber terminal of first modified screen objects and first modified control data relating to the first modified screen objects;

identifying the second set of applets in response to a request by the second type of subscriber terminal; and processing the input file by applying the second set of rules to generate a second output file, the second output file including definitions specific to the second type of subscriber terminal of second modified screen objects and second modified control data relating to the second modified screen objects.

15. The method of claim 14, further comprising:

multiplexing the first output file, the second output file, and a media stream to create a multiple-subscriber-type transport stream.

16. The method of claim 15, further comprising:

transmitting the multiple-subscriber-type transport stream to a first subscriber station having the first type of subscriber terminal and to a second subscriber station having the second type of subscriber terminal.

17. The method of claim 16, further comprising:

retrieving the media stream and the first output file from the multiple-subscriber-type transport stream by the first subscriber station;

retrieving the media stream and the second output file from the multiple-subscriber-type transport stream by the second subscriber station;

decoding the media stream and the first output file by the first subscriber station; and decoding the media stream and the second output file by the second subscriber station.

18. The method of claim 17, further comprising:

displaying the media stream and the first modified screen objects on a first display device of the first subscriber station; and displaying the media stream and the second modified screen objects on a second display device of the second subscriber station.

19. The method of claim 18, further comprising:

receiving a first user input by the first subscriber station;

responding to the first user input by the first subscriber station in accordance with the first modified control data;

receiving a second user input by the second subscriber station; and responding to the second user input by the second subscriber station in accordance with the second modified control data.

20. A system for distributing video data while providing interactive support to multiple types of subscriber terminals, the system comprising:

a source of video data to be distributed to a first subscriber with a first type of subscriber terminal and a second subscriber with a second type of subscriber terminal;

a source of first and second applets including interactive data to be distributed in response to a respective request by the first and second subscribers;

a transport processing multiplexer for multiplexing the video data and the interactive data to generate a transport stream;

where the first and second applets respectively comprise a first interactive data specifically modified for use with the first type of subscriber terminal, and a second interactive data specifically modified for use with the second type of subscriber terminal.

* * * * *